United States Patent
Kato

(10) Patent No.: US 7,647,388 B2
(45) Date of Patent: Jan. 12, 2010

(54) CONTROL INFORMATION TRANSMISSION METHOD, INTERMEDIARY SERVER, AND CONTROLLED DEVICE

(75) Inventor: Daisaku Kato, Sagamihara (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 649 days.

(21) Appl. No.: 10/546,035

(22) PCT Filed: Feb. 19, 2004

(86) PCT No.: PCT/JP2004/001876

§ 371 (c)(1), (2), (4) Date: Aug. 18, 2005

(87) PCT Pub. No.: WO2004/075479

PCT Pub. Date: Sep. 2, 2004

(65) Prior Publication Data

US 2006/0161639 A1    Jul. 20, 2006

(30) Foreign Application Priority Data

Feb. 19, 2003    (JP)    ............... 2003-040792

(51) Int. Cl.
| | |
|---|---|
| G06F 15/16 | (2006.01) |
| G06F 12/14 | (2006.01) |
| G06F 13/42 | (2006.01) |
| H04N 7/173 | (2006.01) |
| H04L 12/16 | (2006.01) |
| H04W 36/00 | (2006.01) |

(52) U.S. Cl. ............... 709/219; 709/227; 709/217; 725/87; 713/193; 370/260; 455/435.1

(58) Field of Classification Search ............... 709/219, 709/227; 725/87, 97, 116; 370/260; 713/193; 455/435.1; 340/825
See application file for complete search history.

(56) References Cited

U.S. PATENT DOCUMENTS 6,269,101 B1 *    7/2001    Gerszberg et al. ........... 370/404

(Continued)

FOREIGN PATENT DOCUMENTS

JP    08-314835    11/1996

(Continued)

OTHER PUBLICATIONS

Nakano, S., et al., "Limit of NAT", *Nikkei Byte*, pp. 92-106, (2002). [With English Translation].

(Continued)

*Primary Examiner*—William C Vaughn, Jr.
*Assistant Examiner*—Muktesh G Gupta
(74) *Attorney, Agent, or Firm*—The Nath Law Group; Jerald L. Meyer; Jonathan A. Kindney

(57) ABSTRACT

A controlled device (12) sends a signal to a intermediary server (21) at a predetermined time interval, and the intermediary server (21) receives the signal from the controlled device (12) with a private address allocated by a router (11) and changes an operation mode from a passive mode to an active mode. The operation of the controlled device (12) is changed to the passive mode. The intermediary server (21) continuously establishes a communication path with the controlled device (12). The intermediary server (21), which receives control information from a control terminal (41), relays data transmitted via two communication paths, that is, a communication path established with the control terminal (41) and a communication path established with the controlled device (12), to allow the control terminal (41) to control the controlled device (12) operating in the passive mode.

11 Claims, 11 Drawing Sheets

U.S. PATENT DOCUMENTS

| | | | |
|---|---|---|---|
| 7,073,055 B1 * | 7/2006 | Freed et al. | 713/155 |
| 7,194,756 B2 * | 3/2007 | Addington et al. | 725/116 |
| 7,228,438 B2 * | 6/2007 | Bushmitch et al. | 713/193 |
| 2002/0078198 A1 * | 6/2002 | Buchbinder et al. | 709/224 |
| 2002/0150387 A1 * | 10/2002 | Kunii et al. | 386/83 |
| 2002/0184200 A1 * | 12/2002 | Ueda et al. | 707/3 |
| 2003/0050062 A1 * | 3/2003 | Chen et al. | 455/435 |
| 2003/0067886 A1 * | 4/2003 | Son et al. | 370/260 |
| 2003/0229900 A1 * | 12/2003 | Reisman | 725/87 |
| 2005/0165918 A1 * | 7/2005 | Wantanabe et al. | 709/223 |
| 2005/0216942 A1 * | 9/2005 | Barton | 725/97 |

FOREIGN PATENT DOCUMENTS

| | | |
|---|---|---|
| JP | 10-210181 | 8/1998 |
| JP | 11-355302 | 12/1999 |
| JP | 2000-059871 | 2/2000 |
| JP | 3262689 (A) | 12/2001 |
| JP | 2002-077274 | 3/2002 |
| JP | 2002-111735 | 4/2002 |
| JP | 2002-135858 | 5/2002 |
| JP | 2002-141954 | 5/2002 |
| JP | 2002-283287 A | 10/2002 |
| JP | 2003-018181 | 1/2003 |
| JP | 2003-169075 | 6/2003 |
| JP | 2003-244183 | 8/2003 |
| JP | 2004-120547 | 4/2004 |

OTHER PUBLICATIONS

Hitoshi Sasada; "Easy-To-Follow; Internet Structure"; Nikkei Business Publications, Inc. Nov. 22, 2001; pp. 126-131.

Koji Shima, et al. "Inspection of Security Programming Vulnerability and Its Effective Measure", Soft Bank Publishing, Sep. 1, 2002; pp. 12-19.

Takahiro Nuriya; "Complete Strategy for NAT, IP Masquerade; Deliberate Every Problem of 'Address Translation'"; Nikkei Business Publications, Inc.; Aug. 22, 2002; pp. 51-65.

* cited by examiner

FIG. 5

(1) hd5.sotodemo.net/host/10026102/index.html (2) hd5.sotodemo.net/10026102/index.html (3) hd5.sotodemo.net/kato_daisaku/index.html (4) hd5.sotodemo.net/control?user=10026102?sid=2e98xjeu23f&page=top_menu (5) hd5.sotodemo.net/kato_daisaku/

(6) hd5.sotodemo.net/kato_daisaku/i/

(7) hd5.sotodemo.net/kato_daisaku/j/

(8) hd5.sotodemo.net/kato_daisaku/e/

FIG. 10

| ○ | ○○FOREIGN FILM THEATER △△△△△△ | | |
|---|---|---|---|
| | AUGUST 19    21:00~23:09 | 5ch | SP |

| ○ | ○○PROJECT | | |
|---|---|---|---|
| | AUGUST 12    11:00~12:09 | 7ch | SP |

| ○ | △△△△△△ | | |
|---|---|---|---|
| | AUGUST 13    15:00~17:09 | 9ch | SP |

| ○ | □□□□□□□□ | | |
|---|---|---|---|
| | AUGUST 11    20:00~21:52 | 5ch | SP |

| ○ | ○○○○○○○○○ | | |
|---|---|---|---|
| | AUGUST 19  21:00~23:09 | 9ch | SP |

| CHANGE | DELETE |
|---|---|

FIG. 11

| ☐ | ○○FAMILY FILM △△△△△△ |||
|---|---|---|---|
| | AUGUST 1   15:00~17:00 | 5ch | SP |

| ☐ | ○○SPECIAL  △△△△△△ |||
|---|---|---|---|
| | AUGUST 3   20:00~22:03 | 7ch | LP |

| ☐ | ○○ROAD-SHOW  △△△△△△ |||
|---|---|---|---|
| | AUGUST 4   10:00~12:54 | 9ch | SP |

| ☐ | ○○THEATER △△△△△△ |||
|---|---|---|---|
| | AUGUST 4   20:00~21:49 | 5ch | EP |

| ☐ | ○○NEWS   △△△△△△ |||
|---|---|---|---|
| | AUGUST 6   19:00~19:55 | 5ch | EP |

| ☐ | ○○MUSIC STAGE △△△△△△ |||
|---|---|---|---|
| | AUGUST 7   22:00~23:22 | 9ch | SP |

| ☐ | ○○BIG    △△△△△△ |||
|---|---|---|---|
| | AUGUST 7   15:00~16:09 | 7ch | SEP |

| DELETE | CANCEL SELECTION |
|---|---|

CONTROL INFORMATION TRANSMISSION METHOD, INTERMEDIARY SERVER, AND CONTROLLED DEVICE

TECHNICAL FIELD

The present invention relates to a control information transmission method executed by an Internet-connected terminal for controlling a controlled device which is connected to a private network connected to the Internet via a router (path selection device) having the NAT (Network Address Translator) function and to which a global IP address is not allocated. The present invention also relates to an intermediary server connected to the Internet for transmitting the control information and to a controlled device controlled by the terminal.

BACKGROUND ART

Conventionally, a video signal recorder such as a VCR has been used as a time shift machine that records a broadcast program in advance to allow a viewer to play the recorded program when the view has time to view. A method is also under development for remotely programming a video signal recorder, which is a controlled device, to record a user-requested program, for example, by transmitting an electronic mail to the video signal recorder.

However, even if the video signal recorder, for example, a VCR, can be programmed to record a program remotely, the specified program cannot be recorded satisfactorily if the blank area of recording videotape is insufficient or if the requested recording time overlaps with an already-requested recording time.

Therefore, to remotely program a video signal recorder in the home for recording a program by connecting it to the Internet via a router, the video signal recorder must be programmed for recording via two-way communication, for example, by transmitting the information stored in the video signal recorder, such as existing timer recording information, recording mode, and available recording medium amount, to a terminal.

That is, it is required that an electronic mail describing a control operation be sent to the video signal recorder and that the video signal recorder that receives the electronic mail perform the processing according to the received mail and return the processing result via an electronic mail for use in timer recording.

Such a transmission is disclosed in Japanese Patent Laid-Open Publication No. 2002-135858 which describes the following method. A remotely operated device sends information on a controlled apparatus to a terminal. Based on the received information, the terminal generates a control operation instruction signal for the controlled apparatus. The terminal transmits the control operation instruction signal to the remotely operated device to operate the controlled apparatus via the remotely operated device.

However, this method involves cumbersome steps for allocating a recording area for recording a program to be recorded. For example, to select an unnecessary recorded program from already-recorded programs for erasing the area, an electronic mail must be sent and received several times. For example, an electronic mail is first sent to obtain a list of recorded programs, a program to be erased is selected from the list of programs returned by the mail and an electronic mail is sent to erase the area and, after the erasure processing result mail is received, an electronic mail for programming the recorder to record a program is sent. It is difficult to say that this system is a preferable timer recording operation system.

In view of this, a method is devised to directly control a video signal recorder (VCR) via the Internet without using electronic mails. In this case, a home VCR is controlled by connecting it to the Internet via a home gateway. A control system connected to the Internet for operation requires enhanced security for the home gateway to prevent the VCR from being remotely operated via a malicious connection.

For example, Japanese Patent Laid-Open Publication No. 2002-77274 describes the following. Communication is performed via an access server connected to the Internet. A terminal can connect to the home gateway only when it is successfully authenticated by the access server. The terminal sends a control message to a VCR via the home gateway to control the VCR.

Control information to be given to a controlled device connected to the Internet is transmitted from the terminal as a control message specifying a global IP address. Even when a controlled device in a user's home is connected to the Internet via a path selection device such as a home gateway, the operated device is remotely controlled with the specified global IP (Internet Protocol) address of the device.

Today, IP addresses are allocated as IPv4 (Internet Protocol version 4) addresses in most cases. Under IPv4 in which a global IP address is managed by 32 bits, only about 4.3 billions of addresses can be defined.

Therefore, global IP addresses are limited and all apparatuses connected to the Internet cannot have global IP addresses. In a standard home, a global IP address that is obtained from a provider is usually shared among a plurality of PCs.

To solve this problem, a method is developed and used in which a router having the NAT (Network Address Translator) function is used to allow personal computers and controlled devices with no global IP addresses to communicate with a server connected to the Internet.

Normally, either a fixed global IP address or a dynamic global IP address that has not a fixed IP address value is allocated to a router. A router allocates a private address to a computer, which is connected to a private network via the router, for controlling the connection in the private network.

In response to a request from a computer in the private network to connect to the Internet, the router replaces the private address of the computer with its own global IP address and transmits the request to the Internet for connection to a desired server.

The response from the server is returned to the global IP address of the router. Next, the router, which receives the returned data, replaces the global IP address of the data with the private address of the computer and transfers the data to the computer connected previously to the server.

As described above, a router transmits a connection request signal, received from a computer connected to a home network in the home, to an apparatus connected to the Internet and transfers data, returned in response to the transmission, to the computer. Therefore, a computer with no global IP address can use the NAT function of a router to communicate with an apparatus connected to the Internet.

This NAT function solves the problem of insufficient global IP addresses and makes Internet communication possible. However, note that communication to and from a computer in a home network via the NAT function can be executed only when the computer starts the communication.

Meanwhile, it is difficult for a computer connected to the Internet to connect to a computer connected to a router having the NAT function because of the limitation of the NAT function. That is, the problem is that a computer connected to the Internet cannot start communication with a computer connected to a router. This problem is the so-called NAT traversal problem. An attempt is made to solve the NAT traversal problem (For example, see "Limit of NAT" in September 2002 issue of NIKKEI BYTE, Nikkei Business Publications, PP. 92-107).

In the mean time, a plurality of controlled devices, each connected to a home LAN (private network) configured using a router having the NAT function and each having a private IP address, can share the global IP address allocated to the router to access the Internet. However, it is difficult for a terminal connected to the Internet to start connection to a controlled device having a private IP address as described above and, even when a router with an extended NAT function is used, the number of connectable apparatuses is limited in many cases.

In view of the foregoing, the present invention provides a method that allows an existing and permanently Internet-connected router to be used and that does not require a special communication language to be used for the router for solving the NAT traversal problem. In addition, even if the HTTP (HyperText Transfer Protocol) server protocol currently used as the standard protocol is used, the method requires only a partial change in the handling of the protocol but not a major change in the software that uses the protocol. In addition, the method allows a control terminal connected to the Internet to start transmitting control information to a controlled device connected to a private network for executing the control operation.

Furthermore, the present invention aims to provide a control information transmission method that allows a plurality of controlled devices to connect to a router and, even when a firewall is installed between a controlled apparatus and the Internet, allows an Internet-connected terminal to start two-way communication for control operations. In addition, the present invention aims to configure an intermediary server connected to the Internet for transmission of the control information as well as a controlled device controlled by the terminal.

DISCLOSURE OF THE INVENTION

To solve the above problems, the present invention provides means (1)-(13) given below.

That is,

1) A control information transmission method for use in a communication system comprising a controlled device connected to the Internet via a router and not publicizing an IP address thereof; a terminal for transmitting control information via the Internet for controlling the controlled device; and an intermediary server, connected to the Internet, for receiving the control information transmitted from the terminal and transmitting the control information to the controlled device for carrying out communication between the controlled device and the terminal, the method comprising the steps of:

transmitting a connection request signal from the controlled device to the intermediary server, with a mode of communication with the intermediary server being an active connection;

receiving, by the intermediary server, the transmitted connection request signal, with a mode of communication with the controlled device being a passive connection, and authenticating the controlled device;

changing, by the controlled device, the mode of communication with the intermediary server to the passive connection and at the same time changing, by the intermediary server, the mode of communication with the controlled device to the active connection after authenticating, by the intermediary server, the controlled device as a controlled device enabled for communication;

establishing a communication path, by the intermediary server, with the controlled device when the controlled device is authenticated as the controlled device enabled for communication and, at the same time, transmitting pseudo transmission information to request the controlled device, with which the communication path has been established, to respond;

continuously maintaining, by the controlled device that received the pseudo transmission information, the established communication path by carrying out pseudo transmission communication repeatedly, the pseudo transmission communication being carried out by generating pseudo response information and returning the generated pseudo response information to the intermediary server; and waiting, by the intermediary server, for a reception of the control information transmitted from the terminal and transmitting the control information, received via the internet, to the controlled device.

2) The control information transmission method described in 1) above wherein the control information is timer recording information for recording a broadcasts program.

3) The control information transmission method described in 1) above wherein the controlled device is a video signal recording device for recording a received broadcast program.

4) The control information transmission method described in 1) above wherein the controlled device is a video signal transmission device for transmitting a photographed video signal.

5) The control information transmission method described in 1) above wherein the controlled device is authenticated by detecting if the connection request signal matches a character string described in registration information registered in the intermediary server in advance.

6) An intermediary server for use in a communication system comprising a controlled device connected to the Internet via a router and not publicizing an IP address thereof; a terminal for transmitting control information via the Internet for controlling the controlled device; and an intermediary server, connected to the Internet, for receiving the control information transmitted from the terminal and transmitting the control information to the controlled device for carrying out communication between the controlled device and the terminal, the intermediary server at least comprising:

connection request receiving means for receiving a connection request signal transmitted from the controlled device, with a mode of communication with the controlled device being a passive connection;

authentication means for authenticating the controlled device by detecting if the connection request signal received by the connection request signal received by the connection request receiving means is a signal sent from a controlled device enabled for communication;

connection mode changing means for changing the mode of communication with the controlled device to an active connection after the authentication means authenticates the controlled device;

communication path establishing means for establishing a communication path with the controlled device after the authentication means authenticates the controlled device;

pseudo transmission information transmission means for transmitting pseudo transmission information to the controlled device via the established communication path to request the controlled device to respond;

communication path continuation maintenance means for continuously maintaining the established communication path by carrying out pseudo transmission communication repeatedly, the pseudo transmission communication being carried out by receiving pseudo response information returned from the controlled device in response to the transmitted pseudo transmission information; and received information intermediary means for waiting for a reception of the control information transmitted from the terminal via the internet and transmitting the received control information to the controlled device via the communication path.

7) The intermediary server described in 6) above
wherein the authentication means authenticates the controlled device by detecting if the connection request signal matches a character string described in registration information registered in.

8) The intermediary server described in 6) above
wherein the pseudo transmission information is information based on a GET method or a HEAD method.

9) A controlled device for use in a communication system comprising a controlled device connected to the Internet via a router and not publicizing an IP address thereof; a terminal for transmitting control information via the Internet for controlling the controlled device; and an intermediary server, connected to the Internet, for receiving the control information transmitted from the terminal and transmitting the control information to the controlled device for carrying out communication between the controlled device and the terminal, the controlled device comprising:

connection request transmission means for transmitting a connection request signal to the intermediary server, with a mode of communication with said intermediary server being an active connection;

connection mode changing means for changing the mode of communication with the intermediary server to a passive connection after the connection request signal transmitted from the connection request transmitting means is received by the intermediary server and the controlled device is authenticated, by the intermediary server, as a controlled device enabled for communication;

pseudo response information transmission means for receiving pseudo transmission information, generating pseudo response information in response to the reception, and returning the generated response information to the intermediary server, the pseudo transmission information being transmitted by the intermediary server via a communication path established between the controlled device and the intermediary server after the controlled device is authenticated by the intermediary server, the pseudo transmission information requesting the controlled device to respond; and control operation means for receiving the control information via the communication path, to perform a control operation for the controlled device based on the received control information the received control information being received by the intermediary server via the internet.

10) The controlled device described in 9) above
wherein the controlled device is a video signal recording device for recording a received broadcast program.

11) The controlled device described in 10) above
wherein, when the control information received by the control operation means is control information requesting a transmission of a list of programs to be timer-recorded, the control operation means transmits information on a timer recoding list describing a list of programs set up for timer recording to the intermediary server.

12) The controlled device described in 10) above
wherein, when control information on cancellation of timer recording of a program, which is one of programs set up in advance by the control operation means for timer recording but for which timer recording is to be canceled, is received, the control operation means cancels the timer recording for the specified particular program.

BRIEF DESCRIPTION OF THE DRAWINGS

FIG. 5 is an example of URL descriptions indicating the sites connected to the Internet in the embodiment of the present invention.

FIG. 10 is a diagram showing an example of the display of the timer recording list page screen on the control terminal in the embodiment of the present invention.

FIG. 11 is a diagram showing an example of the display of the recorded program list screen displayed on the control terminal.

BEST MODE FOR CARRYING OUT THE INVENTION

An embodiment of a control information transmission method, an intermediary server, and a controlled device according to the present invention will be described below with reference to the drawings using a preferred embodiment of the present invention.

Figure 1:
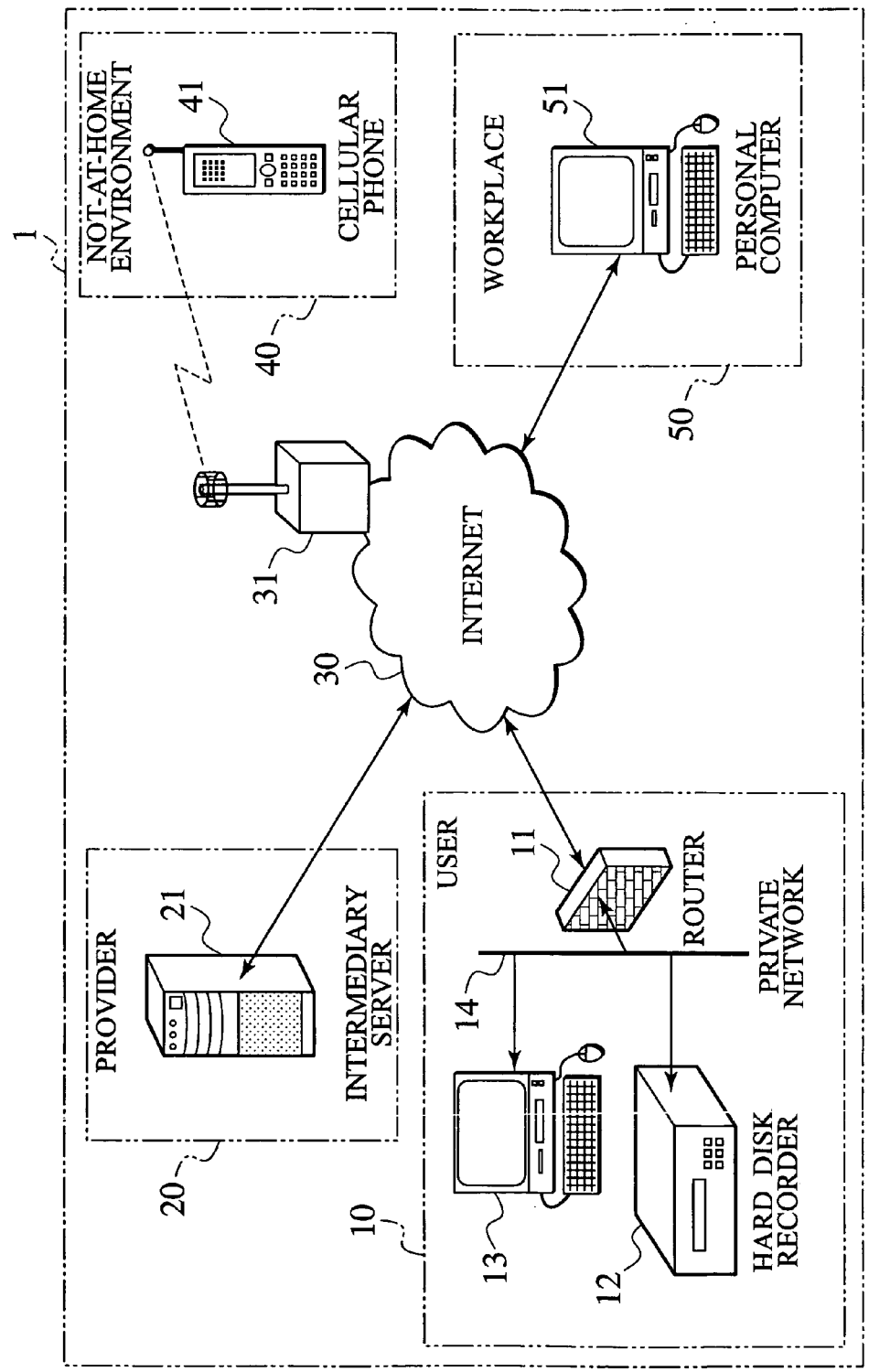
FIG. 1 is a general block diagram of a timer recording network system in an embodiment of the present invention.

FIG. 1 shows the general configuration of a timer recording network system in the embodiment.

A timer recording network system 1 shown in the figure comprises a user environment 10 comprising a router 11, a hard disk recorder 12, a personal computer 13, and a private network 14; a provider 20 where an intermediary server 21 is installed; the Internet 30 where a cellular phone wireless station 31 is installed; a not-at-home environment 40 where a cellular phone 41 is available for use, and a workplace environment 50 where a personal computer 51 is installed.

Note that the hard disk recorder 12 has a connection terminal for connection to the private network 14 that is configured according to a LAN (Local Area Network) standard such as Ethernet (Ethernet/ETHERNET is a registered trademark of Fuji Xerox Co., Ltd.). At the same time, the hard disk recorder 12 is connected to the Internet 30 via the private network 14. In addition, the hard disk recorder 12 is compatible with the protocol on the client side and the server side of HTTP (Hyper Text Transfer Protocol).

The hard disk recorder 12 is connected to the router 11 via the private network 14 and is connected to the Internet 30 via the router 11. The router 11 is connected to the Internet 30, for example, via ADSL (Asymmetric Digital Subscriber Line). The personal computer 13 and the hard disk recorder 12 are connected permanently to the Internet 30 in this connection environment.

The router 11 is a path selection device that is a so-called a broadband router and that has the DHCP (Dynamic Host Configuration Protocol) function. One global IP address is allocated to the router 11. The IP address is a fixed IP address or a dynamic IP address that is allocated by the service provider not shown each time a connection is established. When a CATV network is used as an always-on environment, a private IP address is sometimes given from an in-station router installed in a CATV base station, not shown, to the router 11 in the user environment 10. The operation executed in that case is not described in this specification.

In response to a connection request signal received from the hard disk recorder 12 or the personal computer 13 to which a global IP address is not allocated, the router 11 to which the global IP address described above is allocated uses its own NAT (Network Address Translator) function for transmitting the connection request signal to the Internet 30.

With the NAT function of the router 11, the hard disk recorder 12 connected to the private network 14 can connect to the Internet 30. However, the NAT traversal problem makes it difficult for a terminal connected to the Internet to start connection to the hard disk recorder 12 connected to the private network 14 or puts many limitations on the terminal to do so.

Next, the following generally describes the operation of the timer recording network system 1 that solves the NAT traversal problem.

First, the hard disk recorder 12 sends a connection request signal, which is to be sent to the intermediary server 21 of the provider 20, to the private network 14, wherein the connection request signal includes a URL (Uniform Resource Locator) described in conjunction with information including the manufacturer's serial number of the hard disk recorder that will be described later.

Upon receiving the connection request signal, the router 11 changes the private address part of a data siring received from the hard disk recorder 12 to the global IP address allocated to the router 11 and sends the connection request signal to the Internet 30.

The intermediary server 21, installed in the provider 20 that is an operator responsible for the relay operations, receives a signal, which includes a URL specifying the intermediary server 21, from the data flowing through the Internet 30. The intermediary server 21 compares the information described in the received URL and identifying the hard disk recorder 12 with the information on the hard disk recorder 12, such as the manufacturer's serial number, that is registered and stored in advance and, based on the comparison result, recognizes that a connection request is sent from the hard disk recorder 12 to the intermediary server 21.

Next, in response to the received connection request signal, the intermediary server 21 sends the authentication request screen for authenticating the sender, which will be described later, to the hard disk recorder 12 as the response information. The response information includes the global IP address of the router 11 that is attached to the received connection request signal.

The packetized data returned from the intermediary server 21 is received by the router 11. The router 11 references the communication management table, not shown, to recognize that the received data is a response to the data sent from the hard disk recorder 12. The router 11 rewrites the global IP address attached to the received data to the private IP address of the hard disk recorder 12 and then sends the data to the hard disk recorder 12.

The hard disk recorder 12 receives the data, to which the allocated private IP address is attached, via the private network 14. The hard disk recorder 12 then creates authentication response information, which describes an authentication character string, on the authentication screen and transmits the authentication response information to the intermediary server 21.

Upon receiving the authentication response information, the intermediary server 21 confirms if the response information matches predetermined authentication data submitted by the user in advance. If they match, the intermediary server 21 establishes a communication path to the hard disk recorder 12 and maintains the established communication path according to the method that will be described later.

Next, the following describes the control operation executed when the user operates the cellular phone (portable terminal) 41 in the not-at-home environment 40 to program the hard disk recorder 12, for which the communication path is established with the intermediary server 21, for recording a program.

It is assumed that a web browser, which displays web site information described in HTML (HyperText Markup Language) and publicized on the Internet 30, is installed in the cellular phone 41. The cellular phone 41 uses the web browser to specify the IP address of the intermediary server 21 of the provider 20 in accordance with the method, which will be described later, and sends the control information, used to transfer data to the hard disk recorder 12, to the Internet 30 via the cellular phone wireless station 31.

The intermediary server 21 receives the control information from the cellular phone 41 and sends the received control information to the hard disk recorder 12 to which information is to be transferred. The hard disk recorder 12 receives the control information from the intermediary server 21 and, based on the control information, performs the control operation. The hard disk recorder 12 generates response information based on the control operation and sends the response information to the intermediary server 21. The intermediary server 21 sends the received response information to the cellular phone 41.

The operation described above allows the cellular phone 41 to communicate with the hard disk recorder 12 via the intermediary server 21 to program the hard disk recorder 12 for recording.

If a problem is detected, for example, if the recorder is already programmed for another program for the specified time or if the amount of the recording medium is insufficient for recording all the requested program, the problem information is sent from the hard disk recorder 12 as the response information. The cellular phone 41, which receives the response information, performs the operation to solve the problem based on the response information. For example, the cellular phone 41 erases a recorded program and then programs the recorder for recording.

The cellular phone 41 programs the recorder for recording as described above. Instead of the cellular phone 41, the personal computer 51 at the workplace 50 can also be used to perform the setting control operation for timer recording.

Next, the following describes the communication function executed in the timer recording network system 1 described above.

The communication function is executed as a model of seven hierarchical layers of a computer. In the seven hierarchical layers, a signal flowing in the physical layer, the bottom hierarchical layer, is passed to the data link layer that is the next higher hierarchical layer where a physical communication path with the other end of communication is acquired. In the network layer that is the next higher hierarchical layer, the communication path is selected and the address in the communication path is managed.

In addition, in the transport layer that is the next higher hierarchical layer, data compression and retransmission control are executed and, in the session layer that is the next higher level, a connection is established for sending and receiving data. In the presentation layer that is the next higher level, the data received from the session layer is converted to a format usable by the user and, in the application layer that is the top layer, the transmitted data is processed according to the representation coded in high-level language.

There are two modes for establishing a connection in the session layer: active connection mode and passive connection mode. The active connection mode is a communication mode in which a connection is established by an external apparatus specifying the address of an apparatus in the connection standby status. Conversely, the passive connection mode is a mode in which an apparatus in the connection standby status connects to an external apparatus for communication.

Next, the following describes the communication mode executed in the timer recording network system 1.

First, the TCP (Transmission Control Protocol) connection of the hard disk recorder 12 that is made at first at the connection request time from the hard disk recorder 12 to the intermediary server 21 is made in the active connection mode, and the intermediary server 21 is in the passive connection mode.

The connection relation between the hard disk recorder 12 and the intermediary server 21 is similar to the usual connection between a personal computer and a server on the Internet. That is, the hard disk recorder 12 operates in the active connection mode in the manner similar to that of a personal computer that sends an instruction to a server and receives a response from the server.

The intermediary server 21 operates in the passive connection mode similar to that of a server that waits for an instruction from a personal computer and sends a response to the instruction when instruction information is received.

On the other hand, the intermediary server 21 in this embodiment has its connection mode for the hard disk recorder 12 logically changed after the authentication operation, and connection mode of the hard disk recorder 12 is also changed. That is, after the hard disk recorder 12 is connected to the intermediary server 21, the intermediary server 21 operates as if the intermediary server 21 started connection to the hard disk recorder 12. Although the communication can be made in two ways once the connection is established, the connection from the intermediary server 21 to the hard disk recorder 12 that cannot be carried out because of the NAT traversal problem is carried out by the connection from the hard disk recorder 12 to the intermediary server 21. After the connection, the operation is performed as if the connection was made from the intermediary server 21 to the hard disk recorder 12 without the NAT problem.

The status of the changed connection mode is maintained by the communication between the intermediary server 21 and the hard disk recorder 12 that is carried out at a predetermined time interval. That is, the hard disk recorder 12 is continuously in the operation status in which the hard disk recorder 12 can immediately performs the operation of a server that, when timer recording instruction information is received, performs the operation according to the instruction information, creates response information obtained as a result of the operation, and returns the response information to the intermediary server 21.

Next, when the cellular phone 41 sends a connection request to the intermediary server 21, the intermediary server 21 sends an authentication request to the cellular phone 41. When the authentication response is returned from the cellular phone 41 indicating that the connection is authenticated and the communication path is established, the cellular phone 41 transmits control information to be sent to the hard disk recorder 12.

In this case, the connection modes of the cellular phone 41 and the intermediary server 21 are that the cellular phone operates in the active connection mode and the intermediary server 21 operates in the passive connection mode. Therefore, the connection mode of the intermediary server 21 is logically the active connection mode for the hard disk recorder 12 and passive connection mode for the cellular phone 41.

The intermediary server 21 receives the control information from the cellular phone 41 and sends (transfers) it to the hard disk recorder 12. Also, the intermediary server 21 receives the response information from the hard disk recorder 12 and sends (transfers) it to the cellular phone 41. This transfer of information enables the communication between the cellular phone 41 and the hard disk recorder 12 to be relayed.

In this case, the connection modes of the cellular phone 41 and the hard disk recorder 12 are that the cellular phone 41 operates in the active connection mode and the hard disk recorder 12 is logically in the passive connection mode. Therefore, the connection relation between the cellular phone 41 and the hard disk recorder 12 is the same as that between a control terminal and a controlled device, and thus the cellular phone 41 can ideally perform the control operation for programming the hard disk recorder 12 for recording a program.

Conventionally, it has been difficult for a device connected to the Internet to start the remote operation of a controlled device connected to a private network. However, in the timer recording network system 1 described in this embodiment, the intermediary server 21 is used to solve the NAT traversal problem. That is, a method different from the conventional method is used to allow the cellular phone 41 connected to the Internet to access a home apparatus.

To do so, the hard disk recorder 12 connected to the router 11 is connected to the intermediary server 21 via TCP, and the TCP connection is maintained. This connection allows the hard disk recorder 12 to wait for a connection from the cellular phone 41 via the connection mode of the intermediary server 21 operating under control of HTTP. The standby status is equivalent to the status that would exist immediately after the cellular phone 41 accesses and connects to the hard disk recorder 12.

Therefore, the HTTP server protocol, a commercially available standard protocol, may be used as the protocol language for describing control information and response information. There is no need for a new, unique protocol for solving the NAT traversal problem.

The configuration and the operation of the timer recording network system have been generally described.

Next, the following describes the configuration and the operation of the intermediary server.

Figure 2:
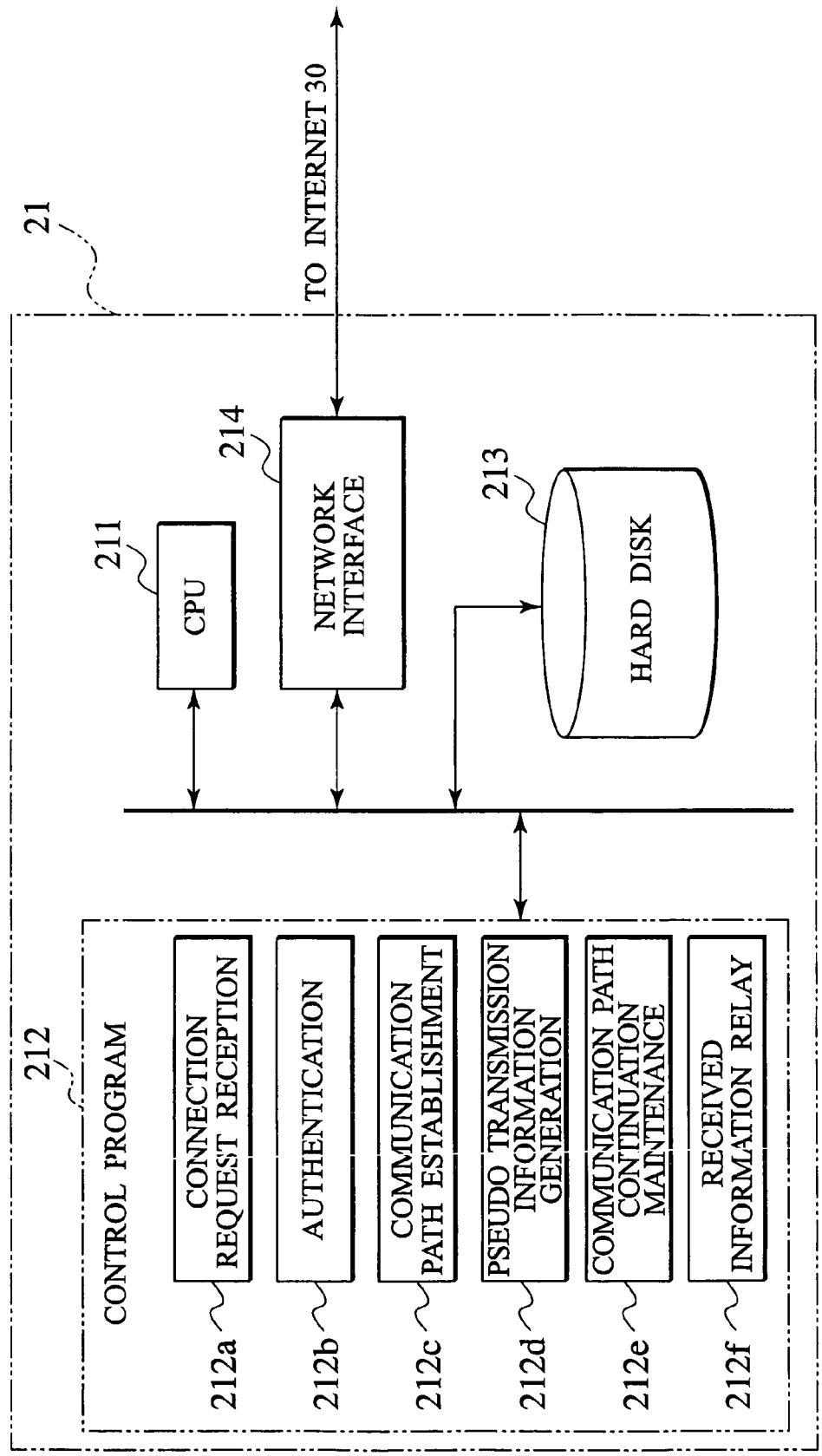
FIG. 2 is a block diagram showing the configuration of an intermediary server in the embodiment of the present invention.

FIG. 2 shows the configuration of the intermediary server. The intermediary server 21 shown in the figure comprises a CPU 211, a control program 212, a hard disk 213, and a network interface 214 for connection to the Internet 30.

The intermediary server 21, which has a global IP address, can be called and communicated from an apparatus connected to the Internet 30 to which the intermediary server 21 is connected via the network interface 214.

The control program 212 comprises the following computer programs for causing the intermediary server 21 to perform the relay operation that will be described later: connection request information reception 212a, authentication 212b for a connection request, communication path establishment 212c for establishing a communication path with a hard disk recorder 12 that is a controlled device, pseudo transmission information generation 212d for requesting a controlled device to respond, communication path continuation maintenance 212e performed by receiving pseudo response information returned in response to the response request and by receiving control information transmitted from the cellular phone 41 that is a terminal, and intermediary transmission 212f for sending received control information to a controlled device. The CPU 211 is run by those computer programs. The hard disk 213 stores data necessary for execution the processing.

Next, the following describes the configuration and the operation of the hard disk recorder 12 more in detail with reference to the drawings.

Figure 3:
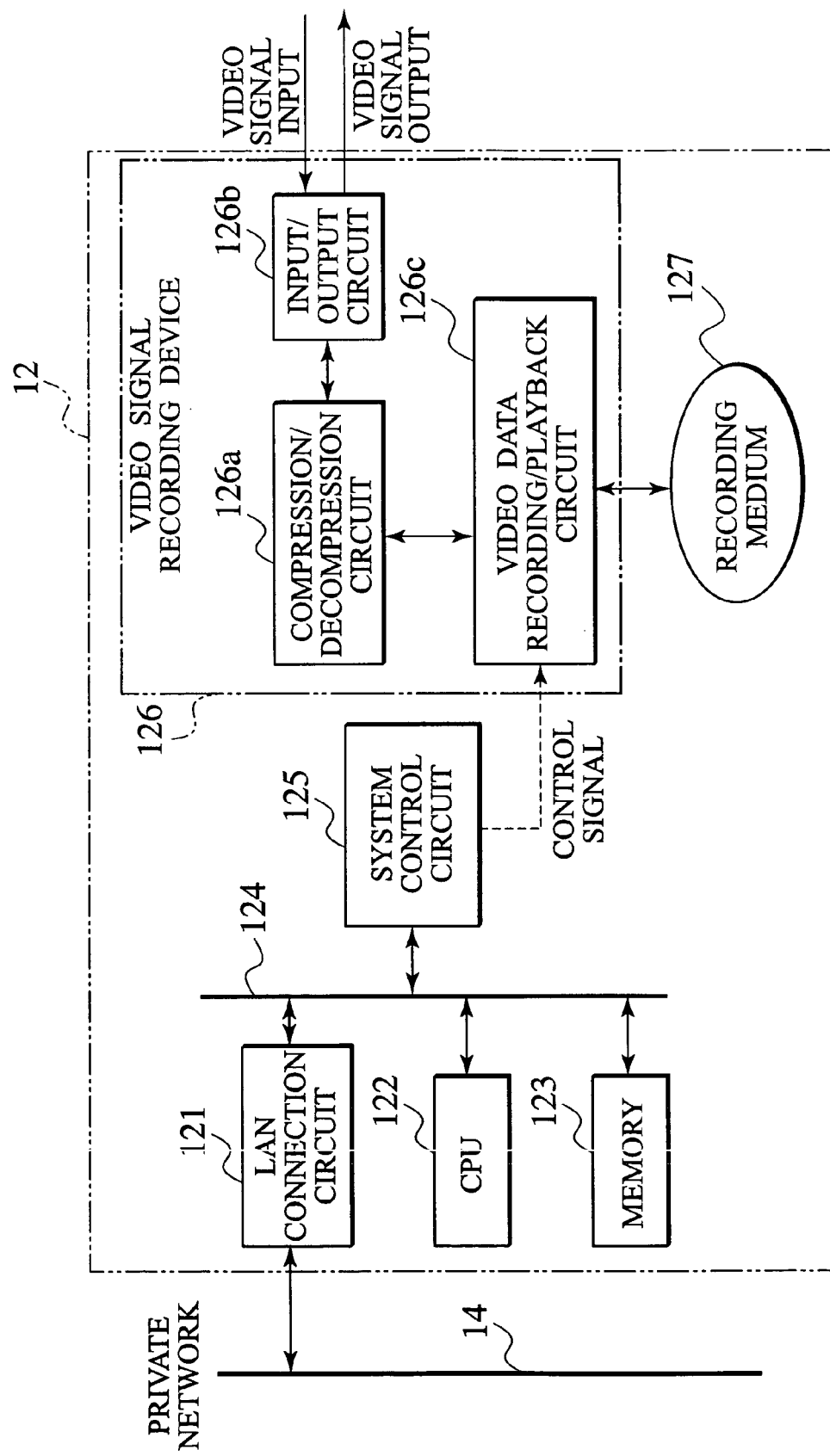
FIG. 3 is a block diagram showing the configuration of a hard disk recorder in the embodiment of the present invention.

FIG. 3 shows the configuration of the hard disk recorder 12.

The hard disk recorder 12 shown in the figure comprises a LAN connection circuit 121, a CPU 122, a memory 123, a CPU bus 124, a system control circuit 125, a video signal recording device 126, and a recording medium (hard disk) 127. The LAN connection circuit 121 is connected to the private network 14.

The video signal recording device 126 comprises a compression/decompression circuit 126a, an input/output circuit 126b, and a video data recording/playback circuit 126c. The video signal of a broadcast program received by a tuner, not shown, is supplied to the input/output circuit 126b as the input signal and, at the same time, the video signal output from the input/output circuit 126b is supplied to a display device, not shown, for display.

Next, the following describes the recording and playback operation of the hard disk recorder 12 with the configuration described above.

First, the video signal input to the input/output circuit 126b has the synchronization signal separated and the synchronization signal generated there, and is converted to the digital video signal by the A/D converter. Next, in the compression/decompression circuit 126a, the converted digital signal is encoded according to a compression encoding standard such as MPEG (moving picture experts group) 1 and MPEG 2 for generating compressed coded signals.

The compressed coded signal has an error correction signal added, and is digitally modulated, by the video data recording/playback circuit 126c for recording on the recording medium 127. The compressed coded video signal is supplied to the recording medium 127 for digital recording.

The recorded digital video signal is read when the playback button on the external panel, not shown, of the hard disk recorder 12 is pressed. The video data recording/playback circuit 126c performs error correction processing and decoding processing which are complementary processing of the recording system, the compression/decompression circuit 126a decodes the compressed signal, and the input/output circuit 126b performs D/A conversion processing for outputting the analog video signal.

The operation of the video data recording/playback circuit 126c is controlled by the control signal supplied from the system control circuit 125. The system control circuit 125 is connected to the LAN connection circuit 121, the CPU 122, and the memory 123 via the CPU bus 124.

Web page creation software for creating HTTP (Hyper Text Transfer Protocol) coded web pages is stored in the memory 123. A web page created by the page creation software is transmitted to the personal computer 51 or the cellular phone 41 for browsing by the web browser function.

Trough the web page, control information for controlling the video signal recording/playback device 126 is received from the personal computer 51 and the cellular phone 41 via the LAN connection circuit 121, and the received control information is supplied to the CPU 122. If the control information is timer recording information, the CPU 122 compares the information with the existing timer recording information already stored in the memory 123 to detect if there is a problem, for example, if there is an overlap in the recording time. Next, a web response page is created based on the detection result and is returned via the LAN connection circuit 121.

If the result indicates that timer recording is possible, the existing timer recording information stored in the memory 123 is updated. When the recording time arrives, the system control circuit 125 sets the channel of the receiving tuner, not shown, to the desired channel, and the video data recording/playback circuit 126c starts the recording operation.

The configuration and the operation of the hard disk recorder 12 have been described.

Next, the following describes the reception of control information and the transmission of response information via a web page.

Figure 4:
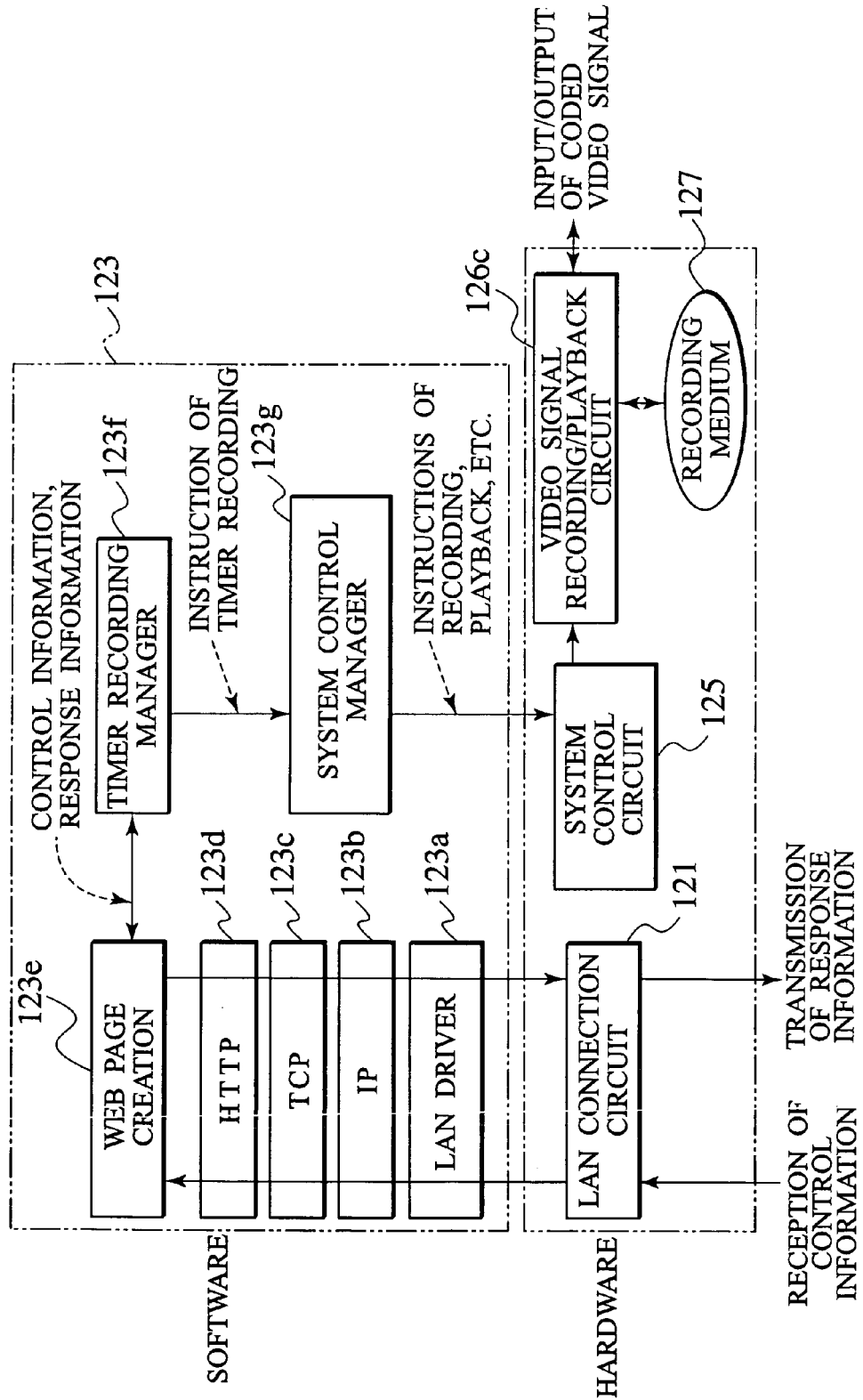
FIG. 4 is a diagram showing the relation between the hardware configuration of the hard disk recorder and the installed software in the embodiment of the present invention.

FIG. 4 shows the relation between the hardware configuring the hard disk recorder 12 and the software installed in the memory 123. The same reference numerals are used for the corresponding elements of FIG. 3. The hardware is shown in the bottom half of the figure, and the software in the top half.

In the figure, control information received via the LAN connection circuit 121 connected to the private network 14 is supplied to web page creation 123e via the software of a LAN driver 123a, IP (Internet Protocol) 123b, TCP (Transmission Control Protocol) 123c, and HTTP (Hyper Text Transfer Protocol) 123d.

Control information is transmitted from the web page creation 123e to a timer recording manager 123f. The timer recording manager 123f executes a control instruction included in the control information, creates response information indicating the result, returns the response information to the web page creation 123e and, at the same time, supplies the timer recording information to a system control manager 123g. The system control manager 123g outputs the instructions associated with recording and playback to the system control circuit 125.

The web page creation 123e creates an HTML (Hyper Text Markup Language) coded web response page based on the response information. The created response page is software-processed by the HTTP 123d, TCP 123c, IP 123b, and LAN driver 123a, and the processed information is sent to the private network 14 via the LAN connection circuit 121.

The configuration and the operation of the hardware and the software of the hard disk recorder 12 have been described.

Next, the following describes in detail the two-way communication carried out between the hard disk recorder 12 and the cellular phone 41.

First, the signal, coded in the HTTP protocol, of the hard disk recorder 12 is supplied to the Internet 30 via the private network 14 and the router 11 having the NAT function in the same manner the personal computer 13 is connected to the Internet 30.

The supplied signal includes predetermined URL information for identifying the intermediary server 21 connected to the Internet 30. The intermediary server 21 waits for the URL signal specified by the hard disk recorder 12, using, for example, TCP port number 80.

Figure 6:
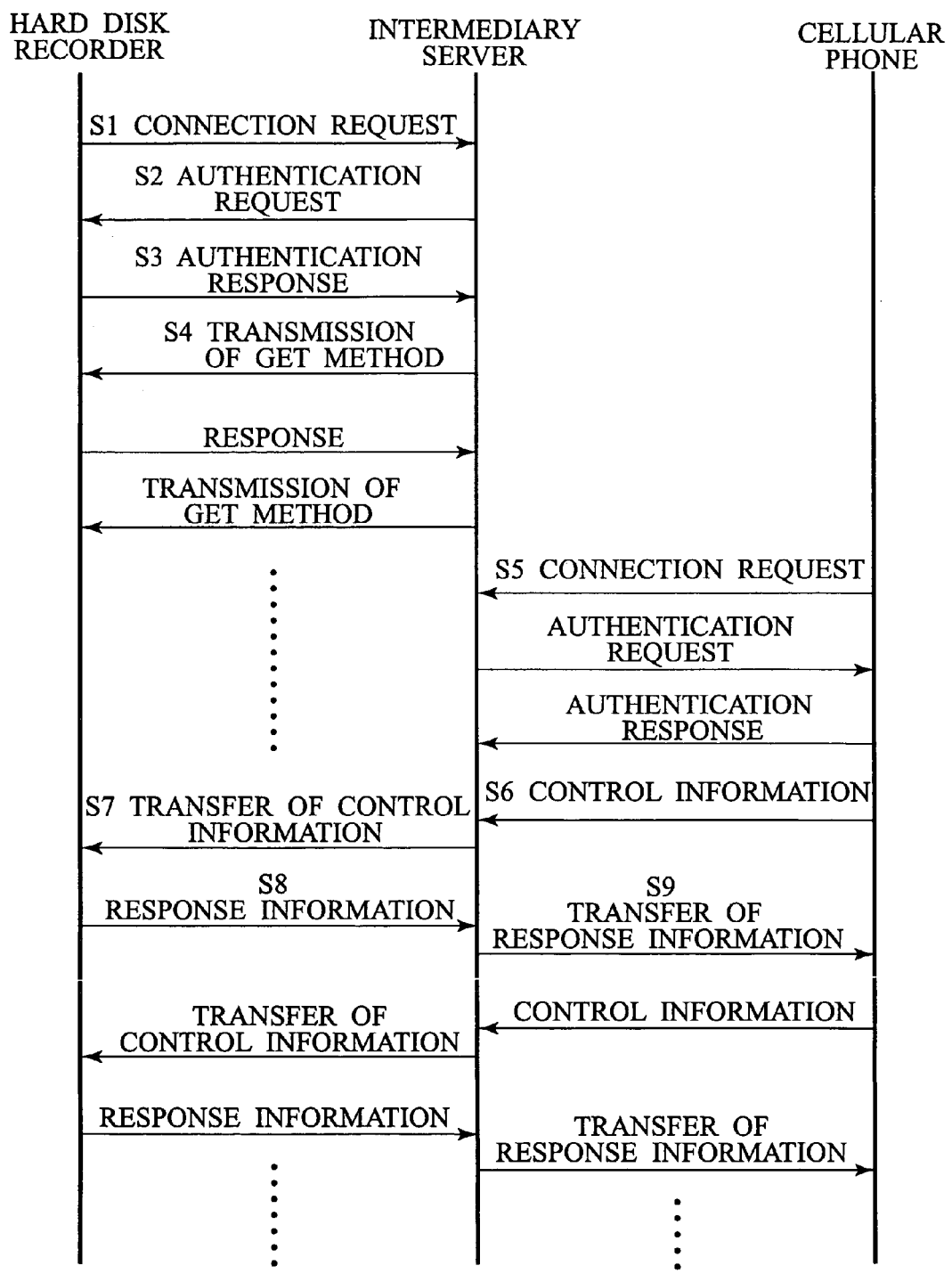
FIG. 6 is a diagram showing the processing sequence of the timer recording network system in the embodiment of the present invention.

FIG. 5 shows an example of URL descriptions indicating the locations of sites connected to the Internet, and FIG. 6 shows the processing sequence of this network system. Referring to the figures, the following describes the operation of the system more in detail.

First, URLs (1)-(8) shown in FIG. 5 will be described. Of those URLs, URL (1) is a URL associated with a connection request (S1 in FIG. 6) which is sent from the hard disk recorder 12 and for which the intermediary server 21 waits. "hd5" at the start indicates the machine type name of the hard disk recorder 12, "host" in the middle part indicates that the connection is from the hard disk recorder 12, and the following numeral "10026102" indicates the serial number (manufacturer's serial number) of the hard disk recorder 12. The last part "index.html" is a resource name indicating that the page is written in HTML.

A commercially available hard disk recorder has a built-in flash ROM, not shown, in which the manufacturer's serial number of the apparatus is stored. The serial number is described as the URL information for identifying that the request is a connection request from the hard disk recorder 12 that is under contract with the provider 20.

Therefore, the connection request signal sent from the hard disk recorder 12, associated with a predetermined URL, is received by the intermediary server 21 that is waiting for that URL. Next, to reject an invalid connection request signal, the intermediary server 21 uses the authentication function to authenticate if the connection is from a pre-registered hard disk recorder 12 and accepts only a pre-registered connection request signal. For that authentication, the Basic authentication that includes an HTTP-defined password is used (S2 and S3 in FIG. 6). The authentication method is only required to prevent a connection from an apparatus other than the pre-registered hard disk recorder 12, and other authentication methods may also be used.

After the hard disk recorder 12 is connected to, and authenticated by, the intermediary server 21, the TCP connection described above is maintained between the hard disk recorder 12 and the intermediary server 21. That is, the hard disk recorder 12 treats this TCP connection as if the connection was started from the intermediary server 21 under control of the HTTP protocol. This allows a cellular phone 41 at a remote location to treat the hard disk recorder 12 as if it was in the operation wait status under the HTTP protocol.

The change in the TCP connection status described above is equivalent to the condition in which the relation between an active connection and a passive connection in the TCP/IP protocol connection is exchanged. After the changed TCP connection is established, the two-way communication between the two can be continuously carried out.

That is, because of the NAT traversal problem described above, the intermediary server 21 cannot start communication with the hard disk recorder 12 with which a communication path is not established. However, after the connection from the hard disk recorder 12 to the intermediary server 21 is established and the hard disk recorder 12 is authenticated, the hard disk recorder 12 is treated as if connected in the passive connection mode. The intermediary server 21 performs operation in such a way that the TCP active connection established with the hard disk recorder 12 is maintained.

The intermediary server 21 uses the GET method of the HTTP protocol or a request message to send a signal, which specifies a resource corresponding to the login page of the hard disk recorder 12, to the hard disk recorder 12 at a predetermined time interval (S4 in FIG. 6). This enables the connection with the hard disk recorder 12 to be continued.

At this time, in relation to the intermediary server 21 connected in the passive connection mode, the hard disk recorder 12 operates as the server waiting for a request from the web browser. Therefore, when the cellular phone 41 is connected to the intermediary server 21 (S5 in FIG. 6), the cellular phone 41 transmits control information, created with the web browser function, to the intermediary server 21 (S6 in FIG. 6) and the intermediary server 21 transmits the received control information to the hard disk recorder 12 (S7 in FIG. 6).

The hard disk recorder 12 that operates as the server executes the control operation for the control information transmitted via the intermediary server 21. That is, because the hard disk recorder 12 operates in the passive connection mode for the control information transmitted via the intermediary server 21, it implements a function that ideally performs the control operation for the control information from the intermediary server 21.

Next, the following describes the function and the operation of the intermediary server 21 more in detail.

First, while the communication path with the hard disk recorder 12 is reserved in the active connection mode, the intermediary server 21 waits for a connection from the cellular phone 41 using a URL such as the one shown in (2) in FIG. 5.

The URL in (2) differs from the URL in (1) in that "/host" in the middle part is not described. The other parts are the same.

The intermediary server 21 also waits for a connection using the URL shown in (3) created by replacing the serial number in the numeral part in (2) with the name kato_daisaku pre-registered in the intermediary server 21 to allow the user to easily remember it.

The intermediary server 21 receives a signal to which the URL shown in (2) or (3) is attached, recognizes that the signal received from the character string is a signal to be transferred to the remotely-controlled hard disk recorder 12, and starts the authentication operation.

The intermediary server 21 references the user information management table, stored in the intermediary server 21 but not shown, to obtain the serial number 10026102 of the hard disk recorder 12 corresponding, one to one, to kato_daisaku and, based on the obtained information, identifies that the device is the hard disk recorder 12 to be remotely operated.

After that, the intermediary server 21 transfers the transmission contents from the cellular phone 41 directly to the hard disk recorder 12 and transfers the transmission contents (S8 in FIG. 6) from the hard disk recorder 12 to the cellular phone 41 (S9 in FIG. 6). That is, the intermediary server 21 only relays the communication contents of the two TCP connections.

Upon receiving the signal from the cellular phone 41, the hard disk recorder 12 sends an HTML-coded authentication page to the intermediary server 21 to display the login page on the cellular phone 41, which will perform remote operation, for confirming if the access is from a valid user.

The intermediary server 21 transfers authentication page data, received from the hard disk recorder 12, directly to the cellular phone 41. The cellular phone 41 decodes the authentication page, received from the hard disk recorder 12, using the web browser. The login page, which will be described later, is displayed on the display unit of the cellular phone 41 for use in the remote operation of the hard disk recorder 12.

If the correct input operation is performed for the login page, the communication between the web browser of the cellular phone 41 and the hard disk recorder 12 is started via the HTTP protocol. Through this communication, the remote operation for the hard disk recorder 12 is executed.

It is assumed that a terminal used for the remote operation, such as the cellular phone 41, disconnects the TCP connection to the intermediary server 21 for each HTTP request. Some type of terminal, for example, a personal computer on which the web browser conforming to the HTTP version 1.1 specifications can be used, performs the operation with the TCP connection maintained. However, for a communication network system where the control operation is performed using devices including a cellular phone, the system can be easily configured if the connection is disconnected for each request.

The control method of the hard disk recorder 12 using the cellular phone 41 has been described. The above control can be performed similarly using the personal computer 51 in the workplace instead of the cellular phone 41.

However, when the cellular phone 41 and the personal computer 51 are used simultaneously and the hard disk recorder 12 is accessed by different users, the relation between the control information and the response information cannot be defined uniquely and the correct control operation cannot be performed. Thus, the simultaneous access control is inhibited.

Next, the following describes how to inhibit the simultaneous access.

For example, if user A and another user B of the same family access the hard disk recorder 12 simultaneously, the authentication work is done correctly for user A and user B and therefore there is a possibility of simultaneous access. To solve this problem, the URL shown in (4) in FIG. 5 is should be as the URL for the user who logs in first.

In the URL in (4), the hard disk recorder 12 generates CGI (Common Gateway Interface) parameters for the part following the character "?", the serial number of the hard disk recorder 12 for the part following "user=", and a random session ID (Identification) for the part "sid=2e98xjeu23f", and transmits the URL to the terminal. The hard disk recorder 12 generates a unique character string for the session ID for each terminal login to manage each session using the generated character string.

The generated session ID is used as the session ID of the URLs of the hyperlinked page screens below the top menu to recognize that the access is made from the same user who logged in before. The part "page=", which indicates a requested page number, is used as a character string indicating a page corresponding to the contents of the operation on the terminal side.

By using the session ID described above, the simultaneous access from different users to the hard disk recorder 12 is inhibited. If the request of a URL with a session management character string is not issued for a predetermined time, for example, for five minutes, the hard disk recorder 12 assumes that the communication with the terminal with the session ID is terminated.

This is because the communication time during which a session is managed should preferably be limited to a predetermined time interval. For example, the logout page can be used to terminate a session and, through that page, the session termination processing can be performed. However, in some cases, the cellular phone 41 side may terminate a session without sending the logout page.

A situation in which the cellular phone 41 side does not terminate a session and the hard disk recorder 12 is inhibited from connecting to other devices is undesirable because the waiting time of other users waiting for a session becomes long. Similarly, this situation is undesirable because it inhibits another user in the user environment 10 from performing the infrared remote control operation, not shown, and inhibits the infrared remote control operation for a long time.

To avoid this situation, if a non-communication time during a session established with the cellular phone 41 side reaches a predetermined time, for example, 5 minutes, the timeout processing is performed for the established session. This allows a connection from other users, and an operation through an infrared remote control, to be accepted.

The URLs in (1)-(4) in FIG. 5 have been described.

Next, the following describes the URLs in (5)-(8) in FIG. 5.

The URL in (5) differs from the URL in (3) in that index.html is omitted because the description of an HTML-coded resource name may be omitted.

"/i" is coded for the last part of the URL in (6), "/j" for the URL in (7), and "/e" for the URL in (8). When the personal computer 51 directly connected to the Internet 30 in FIG. 1 described above communicates with the intermediary server 21, the URL in (5) is used.

For the cellular phone 41 carrying out communication via the cellular phone wireless station 31, the URL in (6) is used to communicate with the intermediary server 21. For other cellular phones carrying out communication via a cellular phone wireless station, not shown, for connection to the Internet 30, the URL in (7) or (8), where "/j" or "/e" is added to the end of the URL, is used for communication according to the wireless station.

In addition, in some cases, a carrier managing cellular phone wireless stations uses the compact HTML, which derives from HTML, or HDML (Handheld Device Markup Language) as the protocol. Even if those protocols are used, a timer recording network system that performs the same control operation as that described above can be implemented.

The processing sequence of a timer recording network system that uses URLs and performs the operation via the Internet has been described.

Next, the following describes the relation of connection among the hard disk recorder 12, the intermediary server 21, and cellular phone 41 more in detail.

In the timer recording network system 1 shown in the embodiment, the hard disk recorder 12 and the intermediary server 21 are connected permanently. In contrast, the intermediary server 21 and the cellular phone 41 are connected for communication in the session-less mode in which the connection is disconnected each time control information is sent from the cellular phone 41 and response information is received.

On the other hand, the connection between the hard disk recorder 12 and the intermediary server 21 is sometimes forced to break by the router 11. Thus, the hard disk recorder 12 has a function to monitor the connection with the intermediary server 21 and, if the connection is broken, to send a connection request signal to the intermediary server 21 during a predetermined time, for example, within one minute.

If the hard disk recorder 12 is not connected to the intermediary server 21 when a terminal (hereinafter called a control terminal) such as the cellular phone 41 or the personal computer 51 is connected to the intermediary server 21, the CPU 211 of the intermediary server 21 performs time out processing to break the connection between the intermediary server 21 and the control terminal, for example, when 60 seconds has elapsed.

When the connection is broken, the user on the control terminal side can recognize that the intermediary server 21 cannot be connected to the hard disk recorder 12. This occurs, for example, when the power cable of the hard disk recorder 12 is not inserted into the power outlet.

Even when the power switch is off, power should be supplied to the LAN connection circuit 121 of the hard disk recorder 12. In addition, when control information is received from the control terminal, the LAN connection circuit 121 that detects the reception should supply power to other circuits connected to the CPU bus 124 so that response information can be created and sent.

If the router 11 is connected to the Internet, for example, via ADSL and if a global IP address is dynamically allocated instead of a fixed IP address, the dynamic IP address may be changed about every 50 hours. When the connection between the hard disk recorder 12 and the intermediary server 21 is broken, the hard disk recorder 12 reconnects to the intermediary server 21 in the same manner as described above.

To maintain the connection with the hard disk recorder 12, the intermediary server 21 may send a request message to the hard disk recorder 12 using the HEAD method of the HTTP protocol instead of sending a request message to the hard disk recorder 12 using the GET method described above. Those messages are messages that request a response for maintaining the connection of the hard disk recorder 12 to the intermediary server 21 but not for controlling the operation of the intermediary server 21 that receives the response. Therefore, as a request message sent by the intermediary server 21 to the hard disk recorder 12 including the message described above, pseudo transmission information, which is a message requesting a simple response, should be sent.

In response to the transmission of the pseudo transmission information, the hard disk recorder 12 returns a short character string response as pseudo response information. While the control terminal remains connected to the intermediary server 21, the intermediary server 21 should not send pseudo transmission information that is a request signal for maintaining the connection.

Next, the following describes the establishment of the communication path among the control terminal, the intermediary server, and the hard disk recorder more in detail.

First, the control terminal side uses the web browser to specify the URL of the intermediary server 21 ((1) in FIG. 5 described above) for opening the page. Upon receiving the URL, the intermediary server 21 identifies the hard disk recorder 12 using the serial number included in the URL.

On behalf of the control terminal, the intermediary server 21 sends a login page request to the hard disk recorder 12 via the TCP connection established between the intermediary server 21 and the hard disk recorder 12. Upon receiving an HTML-coded signal associated the login page returned from the hard disk recorder 12, the intermediary server 21 sends (relays) the signal directly to the control terminal.

As a result, the display screen, which would be obtained by directly accessing the URL of the hard disk recorder 12, is displayed on the control terminal via the web browser. That is, the URL of the intermediary server 21 is treated as if it was the URL of the hard disk recorder 12 and the operation is performed in such a way that the intermediary server 21 is invisible to the user.

The part "hd5.sotodemo.net" included in the character string of the URL ((2) or (3) in FIG. 5 described above) of the intermediary server 21 is a description identifying the intermediary server 21 and is registered in the standard DNS (Domain Name System). However, the intermediary server 21 side does not have to register the IP address of the WAN (Wide Area Network) side as a dynamic DNS in order to implement the NAT function.

When the IP address of a standard intermediary server allocated by the Internet service provider is not fixed, the allocated IP address must be registered as a dynamic DNS even if there is no NAT traversal problem. By doing so, the standard intermediary server can carry out communication using an easy-to-remember URL. However, the intermediary server 21 in this embodiment eliminates the need for registering such a dynamic DNS, thus making the configuration and operation of the intermediary server 21 easy.

Next, the following describes the practical connection processing of the intermediary server 21 more in detail.

FIGS. 7A-7D show an example of screens displayed on the control terminal.

Figure 7A:
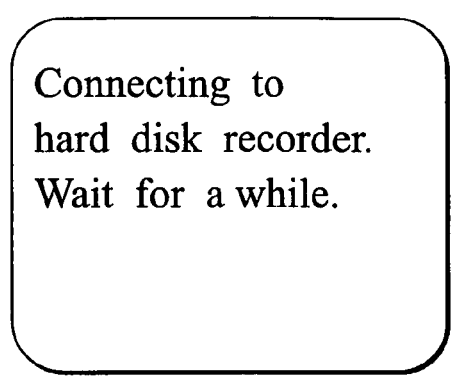
FIG. 7A-FIG. 7D are an example of the display screens each displayed in the corresponding status of a control terminal in the embodiment of the present invention.

First, when the control terminal is connected to the intermediary server 21, the CPU 211 of the intermediary server 21 uses the control program 212 to create an HTML page for displaying the message shown in FIG. 7A and returns it to the control terminal in response to a request of the GET method that is transmitted from the control terminal for requesting the response request of the HTML description data that uses the URL used for the connection.

Figure 7B:
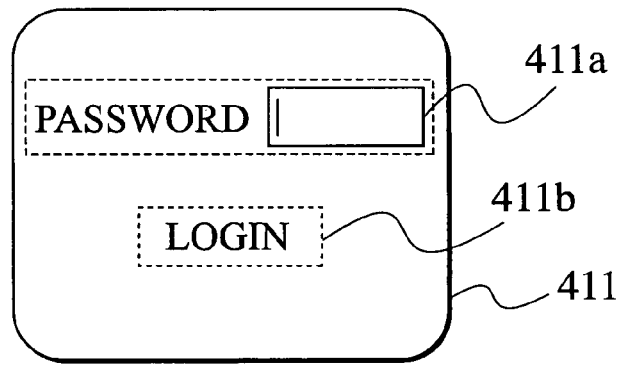

When the hard disk recorder 12 remains connected to the intermediary server 21, the intermediary server 21 sends a request, which requests the URL ((2) in FIG. 5 described above) of the login page, to the control terminal. Then, the login page shown in FIG. 7B is displayed on the screen of the control terminal that receives the request.

Because the user is identified by the URL sent from the control terminal, the control terminal side is only required to receive the password. The entered password can be easily accepted via the input form coded in HTML, and the entered password can be easily transmitted. That is, the interaction between the web browser operation on the control terminal and the corresponding response from the hard disk recorder 12 is similar to the operation performed between the web browser and the web server.

When a password is entered in a password description field 411a displayed in a login page 411 on the control terminal and a login button 411b is pressed, the transmission signal including the contents, entered from the control terminal, is transmitted to the hard disk recorder 12 via the intermediary server 21. If the password is valid, control jumps to the page of the top menu that is the next URL screen and the transmission and reception of control information and response information are started.

The URL in (4) in FIG. 5 described above is used for the URL of the top menu page. The same character string is included also in the URL of the hyperlink specified on the page screen at the next lower hierarchical level of the top menu. The hard disk recorder 12 recognizes that the page screen specified by the URL is accessed by the same user who logged in previously.

Because HTTP is a session-less protocol in which the connection is broken for each communication of control information and response information, session management is required for a communication involved in the login operation. One of the methods is to use a so-called Cookie. However, because the Cookie function cannot be used on a cellular phone in many cases, it is desirable that the random character string described above be included in the URL in the timer recording network system 1 where the cellular phone 41 as the control terminal.

Each time a login from the control terminal is performed, the hard disk recorder 12 generates a random character string that will be used as a session key. This character string is included into the hyperlink to all HTML pages to perform session management for a sequence of communications. Therefore, only a control terminal that includes the random character string in the hyperlink can remotely operate the hard disk recorder 12 and, as a result, the operation of a terminal not logged in is inhibited.

When the control terminal side selects a logout explicitly from the menu or when communication is not carried out for a predetermined time, for example, for five minutes, the hard disk recorder 12 recognizes that the sequence of sessions have been terminated. In that case, the random character string that had been used until the previous session is invalidated. Therefore, the control terminal that starts sending control information again must start from the login operation.

Even if multiple users who know the login password for remotely controlling the hard disk recorder 12 try to perform the remote operation, the session management using a random character string described above allows only one user, who logs in first, to perform a sequence of sessions.

Figure 7C:
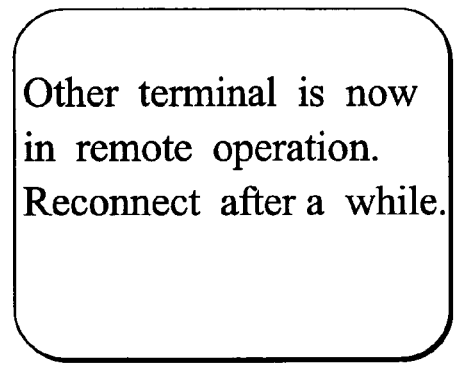
Figure 7D:
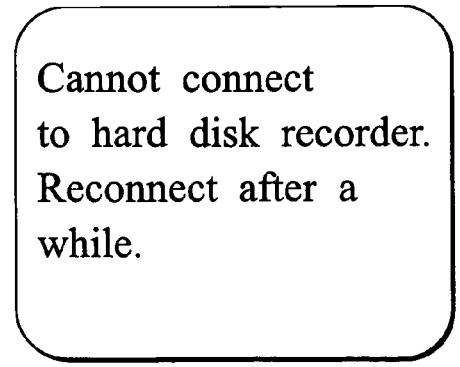

If another user issues a connection request during that period, the display page shown in FIG. 7C is sent to reject the login. The other user starts operation, beginning with the login operation, after the session in operation is terminated.

The operation executed when the hard disk recorder 12 remains connected to the intermediary server 21 has been described. However, when the connection processing between the hard disk recorder 12 and the intermediary server 21 is timed out, for example, because the power cable of the hard disk recorder 12 is disconnected from the plug outlet, the two-way communication cannot be performed and, in that case, the intermediary server 21 transmits the page information shown in FIG. 7D to the control terminal.

Next, the following describes in detail an example of operation in which the hard disk recorder 12 is remotely controlled via the control terminal.

Figure 8:
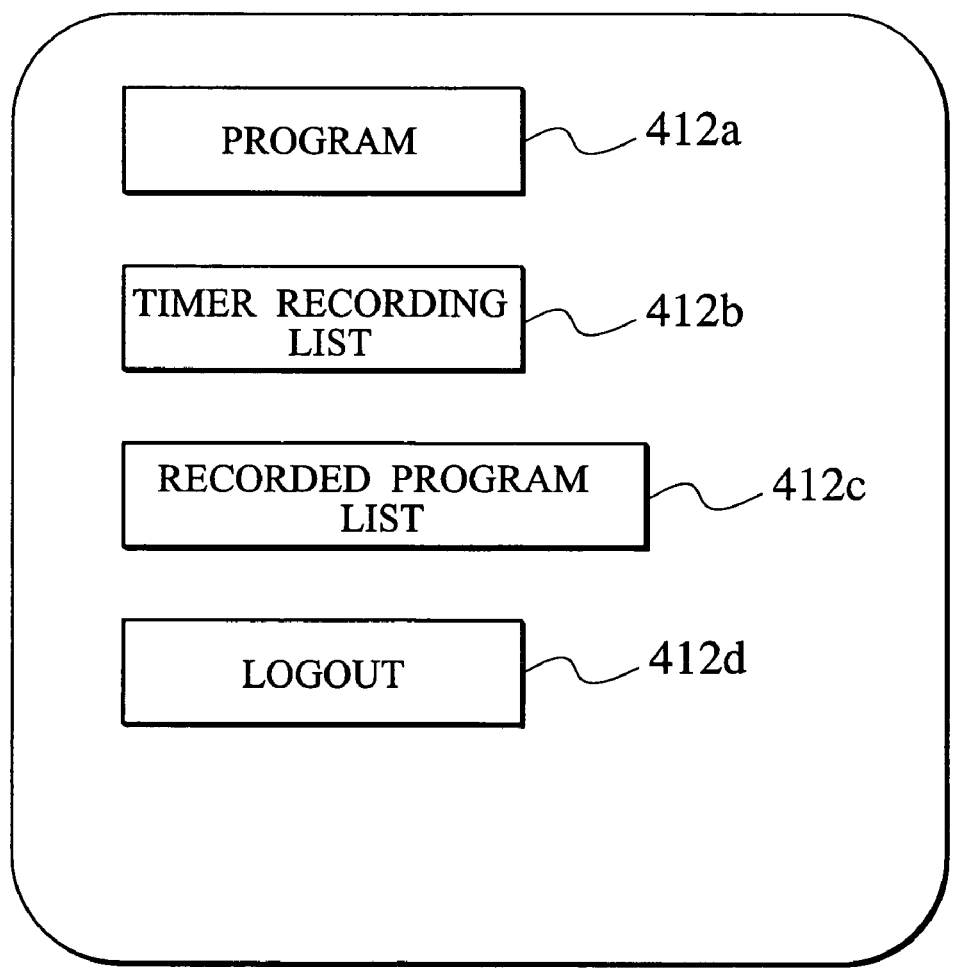
FIG. 8 is a diagram showing an example of the display of the top menu screen displayed after a login to the control terminal in the embodiment of the present invention.

FIG. 8 shows the top menu screen displayed after the user logs in from the control terminal to the hard disk recorder 12.

This top menu screen, an HTML-coded page screen, is created and displayed by the web browser of the control terminal as the display screen. The screen has a Program button 412a, a Timer recording list button 412b, a Recorded program list button 412c, and a Logout button 412d. A page screen is selected to display the corresponding page screen.

When the Program button 412a is pressed, the hard disk recorder 12 is requested through a hyperlink to display a page screen for programming the recorder.

Figure 9:
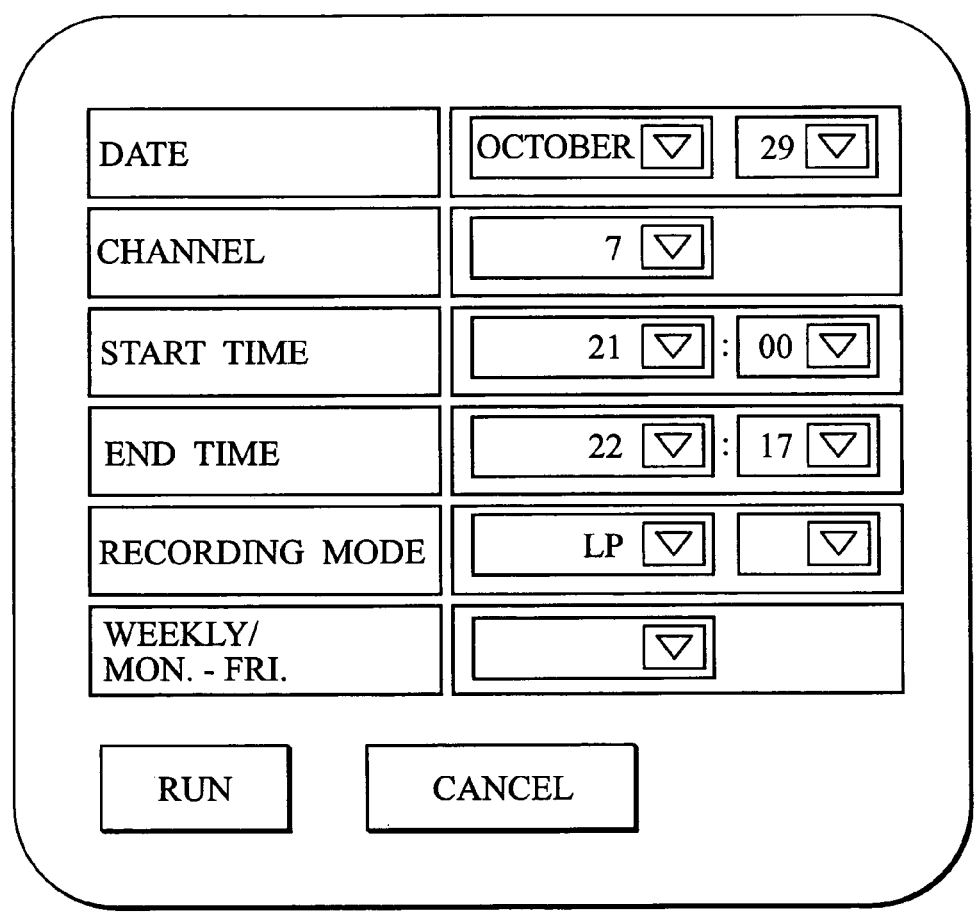
FIG. 9 is a diagram showing an example of the display of the timer recording page screen on the control terminal in the embodiment of the present invention.

FIG. 9 shows an example of the display of the timer recording page screen.

In this example, the screen is designed for the user to program the recorder by selecting information required for timer recording, such as a date, a channel, a start time, an end time, a recording mode, and a weekly recording, individually from the pull-down menu. If the user has information on a program to be timer-recorded, the user can perform timer recording setup operation from that page. Another timer recording method is that the user obtains the Electronic Program Guide from the hard disk recorder 12 or from the service site, not shown, connected to the Internet 30 and, based on the obtained information, programs the recorder for recording.

When the user uses the method described above to select information required for timer recording (input operation) and presses the Run button, the web browser transmits the selected contents to the hard disk recorder 12. Next, the hard disk recorder 12 checks the requested contents and sets up the timer recording. If there is a problem, for example, if the requested recording time overlaps with an already-requested recording time, the hard disk recorder 12 detects that problem, creates an error page not shown, and sends the error page to the control terminal as the response.

Next, when the Timer recording list button 412b is pressed on the top menu screen shown in FIG. 8, the timer recording list page is transmitted to, and displayed on, the control terminal.

Next, the following describes the operation.

FIG. 10 shows an example of the display of the timer recording list page.

The timer recording list page for program recording shown in the figure is a program list that contains programs to be timer-recorded by the hard disk recorder 12 and that is created and displayed as a selectable, tabular-form HTML page.

With this timer recording program list, the control terminal side can confirm the programs to be timer-recorded. In addition, the control terminal side can attach a mark at the start of a program name as necessary to delete the program or to change the program to some other program. The change information is transmitted to the hard disk recorder 12 side. The hard disk recorder 12 creates a changed-program list based on the change information and sends the created list back to the control terminal as a user's intention confirmation page. After receiving control information indicating the confirmation from the control terminal, the hard disk recorder 12 changes or deletes a timer recording entry.

Next, the following describes the operation that is executed when the Recorded program list button 412c is pressed on the top menu screen shown in FIG. 8.

FIG. 11 shows an example of the display of a recorded program list page.

The recorded program list shown in the figure is a list of programs recorded on the hard disk. To reserve a recording area for recording a new program, the user can select and delete one or more programs.

The examples of the display of the timer recording list and the recorded program list have been shown. When many programs are displayed, the page screens each composed of an appropriate number of programs, for example, 10 programs, are displayed.

Conventionally, timer recording through the Electronic Program Guide has been requested by sending timer recording information by electronic mail. In contrast, HTML-coded page information used for timer recording in the timer recording network system 1 described above requires fewer number of communications for browsing the timer recording status or for specifying or changing timer recording than that for timer recording through electronic mail, thus providing a better timer recording network system.

The configuration and the operation of the timer recording network system have been described in which control information and response information are sent and received between a control terminal connected to the Internet and a hard disk recorder connected to a private network but not having a global IP address.

The communication between the control terminal and the hard disk recorder is executed by the software that is stored in both and that performs processing via HTTP and HTML. An intermediary server is also connected to the Internet to solve the NAT traversal problem. However, the user operating the control terminal can communicate control information and response information via a communication path established for communication with the hard disk recorder without worrying about the presence of the intermediary server.

The communication is carried out by connecting the hard disk recorder and the intermediary server and between the intermediary server and the control terminal, each via the TCP connection. The intermediary server, which relays only the communication contents, appears to the control terminal side as if the intermediary server was a proxy server. Although a usual proxy server uses one TCP connection for communication, the communication in the example above differs from the communication of the usual proxy server in that the communication relays the communication between two different TCP connections.

That is, a conventional proxy server has not a function that connects the two devices, that is, the control terminal and the hard disk recorder 12, via an active connection as shown in this embodiment. A so-called proxy server is literally a "proxy" server. The intermediary server shown in this embodiment is included in the category of proxy servers, but the function and the operation are different from those of the conventional proxy server.

The communication between the control terminal and the hard disk recorder has been described. Similarly, the control terminal can remotely control a controlled device connected to a private network by communicating control information and response information to or from the controlled device.

In that case, the controlled device operates as a web server, and the control terminal uses the web browser installed therein to perform the same control operation as described above via an intermediary server connected to the Internet. The most major problem involved in connecting from the Internet side to a controlled device connected to a private network has been the NAT traversal problem. The timer recording network system described above solves the problem.

An example of the controlled device described above is a web camera device connected to a private network in the home (hereinafter sometimes called a home network), that is, a camera device having the web server function. The image captured by this camera device can be viewed remotely using the web browser of the control terminal.

That is, a personal computer or a cellular phone connected to the Internet accesses an image being captured by the web camera device connected to the home network in the home so that the user can browse the captured image.

An example in which a control terminal and a controlled device are connected via the HTTP protocol for solving the NAT traversal problem has been described. Similarly, for a control terminal and a controlled device using a protocol other than the HTTP protocol, control information and response information can be communicated by solving a problem similar to the NAT traversal problem.

Next, the following describes how a controlled device, connected to a home network and having the NAT traversal problem, is remotely controlled using a protocol other than the HTTP protocol.

First, a controlled device connects to an intermediary server connected to the Internet. In this case, when the HTTP protocol is used, it is easy and practical to traverse a firewall and to connect from the home network side to the Internet (WAN side). That connection can also be made via a protocol other than the HTTP protocol.

That is, to set up a connection for traversing the NAT, the TCP connection is established from the controlled device connected to the home network to the intermediary server. The control terminal connected to the Internet is only required to connect to the intermediary server using the same protocol as the one via which the controlled device is connected.

The intermediary server relays protocol data used by the controlled device and the control terminal. That is, the intermediary server logically connects the two TCP connections of the controlled device and the control terminal, and relays packetized data transferred between them.

An example of the configuration of a network system and its operation have been described in detail in which a control terminal, connected to the Internet, performs two-way communication of control information via an intermediary server connected to the Internet for a controlled device which is connected to a private network and to which a private IP address is given only at the communication operation time.

The description has focused on the hard disk recorder 12 as a video signal recording device connected to the router 11. In addition to a device that uses a hard disk as the recording medium, the description can also be applied to a video signal recording device that writes data on a medium such as a magneto-optical recording medium, a phase change recording medium, and a memory device. In addition, for a VCR that uses videotape as the recording medium and that has the function to manage the videotape recording areas, a control terminal can control the management function via the Internet to perform the similar operation.

INDUSTRIAL APPLICABILITY

The control information transmission method according to the present invention allows a control terminal to ideally perform the remote operation for a controlled device connected to a private network while using a conventional router for connection to the Internet. In addition, because only the signals, received via an intermediary server having the security function such as a firewall, are relayed to the controlled device, the present invention has the effect of providing a transmission method for high security level control information.

A video signal recording device can be implemented that is suited for remote timer recording based on timer recording information transmitted as the control information.

A monitor-camera signal transmission method can be implemented that transmits control information to a monitor camera connected to a private network and remotely receives the video signal of the camera.

A high-security-level control information transmission method can be implemented that allows only a controlled device, registered in the intermediary server by the authentication system in advance, can access via the Internet.

The intermediary server according to the present invention has the effect of providing an intermediary server that uses a conventional router for connection to the Internet and that allows a control terminal to perform ideal, real-time remote operation for a controlled device connected to a private network.

Because a controlled device is authenticated using a character string of information registered in the intermediary server in advance, control information can be transmitted at a high security level.

Pseudo transmission information, which is a message requesting a simple response based on the GET method and so on, can reduce the load on a communication path that is maintained continuously.

The controlled device according to the present invention has the effect of providing the configuration of a controlled device that uses a conventional router for connection to the Internet and that allows the control terminal to perform ideal remote operation via the intermediary server.

A device can also be implemented that allows a user to remotely program a video signal recording device, which is a controlled device, for recording a program.

The video signal recording device can transmit a timer recording program list, which contains the programs to be timer-recorded, to a remote location to allow a terminal to cancel a timer recording request and to specify a new recording request. Thus, a recording time overlap can be avoided and a recording area can be reserved even when the recording are is insufficient.

The invention claimed is:

1. A control information transmission method for use in a communication system comprising a controlled device connected to the Internet via a router not publicizing an IP address thereof, and compatible with a protocol on a client side and a server side of HTTP; a terminal for transmitting control information via the Internet for controlling said controlled device; and an intermediary server, connected to the Internet, for receiving the control information transmitted from said terminal and transmitting the control information to said controlled device for carrying out communication between said controlled device and said terminal, said method comprising the steps of:

transmitting, by said controlled device, a connection request signal to said intermediary server, with a TCP connection mode for communication with said intermediary server being set as an active connection mode;

receiving, by said intermediary server, the transmitted connection request signal, with a TCP connection mode for communication with said controlled device being set as a passive connection mode, and authenticating said controlled device;

changing, by said controlled device, the TCP connection mode of said controlled device to the passive connection mode and changing, by said intermediary server, the TCP connection mode of said intermediary server to the active connection mode after authenticating, by said intermediary server, said controlled device as a controlled device enabled for communication;

making said controlled device wait as a server in an operation wait status under the HTTP protocol while maintaining a TCP connection in which the TCP connection mode of said controlled device has been changed to the passive connection mode and the TCP connection mode of said intermediary server has been changed to the active connection mode; and transmitting, by said intermediary server, when receiving the control information transmitted from said terminal via the Internet for controlling said controlled device, the control information to said controlled device waiting as the server.

2. The control information transmission method as claimed in claim 1
wherein said control information is timer recording information for recording a broadcasts program.

3. The control information transmission method as claimed in claim 1
wherein said controlled device is a video signal recording device for recording a received broadcast program.

4. The control information transmission method as claimed in claim 1
wherein said controlled device is a video signal transmission device for transmitting a photographed video signal.

5. The control information transmission method as claimed in claim 1
wherein said controlled device is authenticated by detecting if the connection request signal matches a character string described in registration information registered in said intermediary server in advance.

6. An intermediary server for use in a communication system comprising a controlled device connected to the Internet via a router, not publicizing an IP address thereof, and compatible with a protocol on a client side and a server side of HTTP; a terminal for transmitting control information via the Internet for controlling said controlled device; and an intermediary server, connected to the Internet, for receiving the control information transmitted from said terminal and transmitting the control information to said controlled device for carrying out communication between said controlled device and said terminal, said intermediary server comprising:

connection request receiving means for receiving a connection request signal, which is transmitted from said controlled device whose TCP connection mode for communication with said intermediary server being set as an active connection mode, with a TCP connection mode for communication with said controlled device being set as a passive connection mode;

authentication means for authenticating said controlled device by detecting if the connection request signal received by said connection request receiving means is a signal sent from a controlled device enabled for communication;

connection mode changing means for changing the TCP connection mode of said intermediary server to the active connection mode after said authentication means authenticates said controlled device;

connection maintenance means for maintaining a TCP connection with said controlled device whose TCP mode is changed to the passive connection mode, in a condition where the TCP connection mode of said intermediary server has been changed to the active connection mode by said connection mode changing means; and control information transmitting means for transmitting, when receiving the control information transmitted from said terminal via the Internet for controlling said controlled device in a condition where the TCP connection is maintained by said connection maintenance means, the control information to said controlled device waiting as a server in an operation wait status under the HTTP protocol.

7. The intermediary server as claimed in claim 6
wherein said authentication means authenticates said controlled device by detecting if the connection request signal matches a character string described in registration information registered in advance.

8. A controlled device for use in a communication system comprising a controlled device connected to the Internet via a router, not publicizing an IP address thereof, and compatible with a protocol on a client side and a server side of HTTP; a terminal for transmitting control information via the Internet for controlling said controlled device; and an intermediary server, connected to the Internet, for receiving the control information transmitted from said terminal and transmitting the control information to said controlled device for carrying out communication between said controlled device and said terminal, said controlled device comprising:

connection request transmission means for transmitting a connection request signal to said intermediary server, whose TCP connection mode for communication with said controlled device is set as a passive connection mode, with a TCP connection mode for communication with said intermediary server being set as an active connection mode;

connection mode changing means for changing the TCP connection mode of said controlled device to the passive connection mode after the connection request signal transmitted from said connection request transmitting means is received by said intermediary server and said controlled device is authenticated by said intermediary server, as a controlled device enabled for communication;

waiting means for waiting as a server in an operation wait status under the HTTP protocol while maintaining a TCP connection with said intermediary server whose the TCP connection mode is changed to the active connection mode, in a condition where the TCP connection mode of said controlled device has been changed to the passive connection mode by said connection mode changing means;

receiving means for receiving the control information transmitted from said terminal via the Internet and relayed by said intermediary server in a condition where said waiting means waits as the server in the operation wait status under HTTP protocol; and control operation means for performing a control operation based on the control information received by said receiving means.

9. The controlled device as claimed in claim 8
wherein said controlled device is a video signal recording device for recording a received broadcast program.

10. The controlled device as claimed in claim 9
wherein when the control information received by said control operation means is control information requesting a transmission of a list of programs to be timer-recorded, said control operation means transmits information on a timer recoding list describing a list of programs set up for timer recording to said intermediary server.

11. The controlled device as claimed in claim 9
wherein when control information on cancellation of timer recording of a program, which is one of programs set up in advance by said control operation means for timer recording but for which timer recording is to be canceled, is received, said control operation means cancels the timer recording for the specified particular program.

* * * * *